Sept. 11, 1962     H. E. TAYLOR     3,053,281

TEMPERATURE COMPENSATED CONTROL DEVICE

Filed Sept. 29, 1958

INVENTOR.
HERBERT E. TAYLOR
BY
Teller & McCormick
ATTORNEYS

United States Patent Office 3,053,281
Patented Sept. 11, 1962

3,053,281
TEMPERATURE COMPENSATED CONTROL DEVICE
Herbert E. Taylor, Longmeadow, Mass., assignor to United Aircraft Corporation, East Hartford, Conn., a corporation of Delaware
Filed Sept. 29, 1958, Ser. No. 764,116
1 Claim. (Cl. 137—779)

The present invention relates to control devices and more particularly to temperature compensated control devices utilizing resilient means such as springs and bellows for providing proportionate conversions of force signals to position signals.

The dimension of a resilient means such as a spring or bellows along the line of a force applied thereto is known to vary with temperature changes as well as with changes in the magnitude of the applied force. As a result of the temperature induced dimensional changes, the proportionality of the force-to-position conversions of the resilient means is adversely affected. In the majority of cases, the errors in the position signals provided by the resilient means are minor and do not demand corrective action; but where widely varying temperature conditions are encountered, such errors are often of unacceptable magnitude.

The present invention has as its general object the provision in a control device including a resilient means such as a spring or bellows adapted to convert force signals to proportionate position signals of means subject to dimensional change as a result of temperature change, the said means being associated with the resilient means in such manner that the dimensional changes induced therein by temperature changes regulate the effect of the temperature induced changes in the resilient means on the position signals provided by said resilient means.

A further and more specific object of the invention is the provision of means subject to dimensional change as a result of temperature change in combination with a resilient force-to-position converting means, the said means being constructed and arranged and connected with the resilient means in such manner that the dimensional changes induced therein by temperature changes substantially cancel the effects on the position signals provided by said resilient means of changes in the resiliency of said resilient means which are induced by temperature changes and of dimensional changes in the control device housing which are induced by temperature changes.

The drawing shows a preferred embodiment of the invention and such embodiment will be described, but it will be understood that various changes may be made from the construction disclosed, and that the drawing and description are not to be construed as defining or limiting the scope of the invention, the claim forming a part of this specification being relied upon for that purpose.

Figures 1, 2, 3:
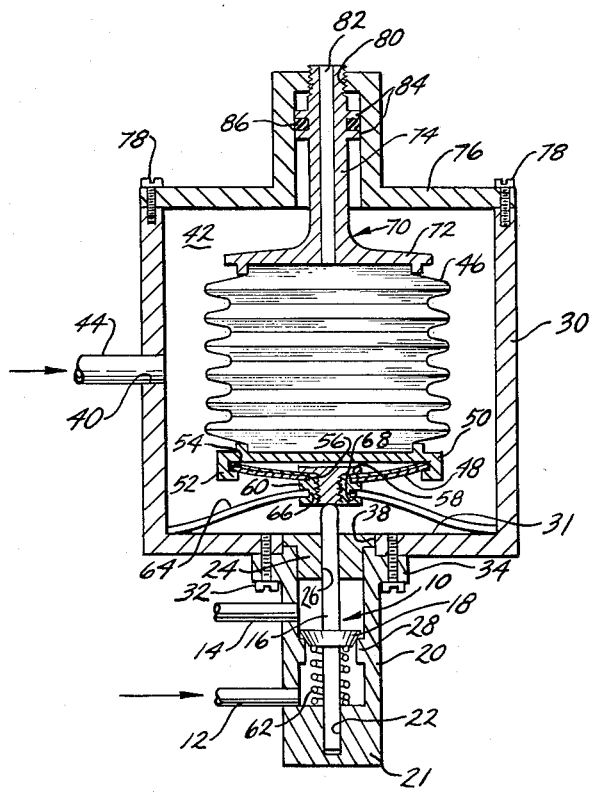
FIG. 1 is a vertical longitudinal section showing a flow control valve and a fluid pressure responsive valve actuator which embodies the present invention.
FIG. 2 is a vertical longitudinal section of a bimetallic element which forms a part of the actuator of FIG. 1; and, FIG. 3 is a top view of the bimetallic element of FIG. 2.

The control device chosen to illustrate the invention and shown in the drawing is a fluid pressure responsive actuator which is adapted to adjust the position of a valve or the like in keeping with a variable fluid pressure. As shown, the actuator is associated with a poppet type valve 10 adapted to regulate fluid flow from an inlet conduit 12 to a discharge conduit 14.

The valve 10 comprises an elongated stem 16 which carries an integrally formed annular valve member 18 between its ends. The valve stem 16 extends axially within a generally cylindrical vertical valve housing 20. The lower end of the housing 20 is closed by a housing end wall 21 which is provided with an axially extending bore 22 in which the lower end portion of the stem 16 is slidably received. The upper end of the valve housing 20 is closed by a plug 24 which is provided with an axially extending bore 26 through which the upper end portion of the valve stem 16 extends. An annular valve seat 28 is formed internally in the housing between the ends thereof and two radial openings are provided respectively below and above the said valve seat for receiving respectively the inlet and discharge conduits 12 and 14.

It will be apparent that vertical movement of the valve stem 16 will cause the valve member 18 supported thereon to vary the fluid flow from the inlet conduit 12 past the annular valve seat 28 to the discharge conduit 14. The fluid pressure responsive actuator which illustrates the present invention acts on the upper end of the valve stem 16 to establish a discrete position of the valve member 18 relative to the valve seat 28 for each fluid pressure encountered. Thus, for a substantially constant inlet conduit pressure, a discrete fluid flow through the conduits 12 and 14 is established for each pressure encountered by the actuator.

A generally cylindrical housing 30 of the pressure responsive actuator has a lower end wall 31 connected to the upper end of the valve housing 20 by means of suitable screws 32, 32. The screws 32, 32 extend through a radially outwardly projecting annular flange 34 which is formed at the upper end of the valve housing 20 and extend into suitably threaded openings in the housing lower end wall 31. An axial opening 38 in the lower end wall 31 of the actuator housing 30 receives the plug 24 with the upper end portion of the valve stem 16 extending upwardly therethrough. There is an opening 40 provided in the side of the actuator housing 30 through which fluid under pressure is introduced into a chamber 42 defined in the said housing, the fluid being supplied through fluid passage means comprising a conduit 44 which extends into the opening 42.

The resilient means for converting force signals to proportionate position signals which is utilized in the pressure responsive actuator comprises a bellows 46 disposed in the housing 30. One end of the bellows 46 is connected with the actuator housing 30 and the other end thereof is connected with the valve 10. More specifically, the said other end of the bellows 46 acts indirectly on the upper end of the valve stem 16 to adjust the vertical position thereof. The bellows 46 is surrounded and acted on by the fluid under pressure in the housing chamber 42 and a fluid at substantially constant pressure contained within the bellows acts thereon in opposition to the fluid in the chamber 42.

It will be seen that the length of the bellows 46 will vary in keeping with the pressure of the fluid in the chamber 42 whereby the position of the valve 10 will be adjusted in keeping with the said pressure. In addition, the length of the bellows 46 will vary as its temperature changes, the temperature of the bellows in this instance being determined by the temperatures of the surrounding fluid and the fluid contained therewithin. These temperature induced changes in bellows length obviously will adversely affect the proportionality of the force or pressure-to-position conversions of the bellows. The actuator housing 30 with which the bellows 46 is connected also undergoes dimensional changes as a result of temperature changes and it will be seen that such dimensional changes are transmitted through the bellows to the valve 10 to cause additional inaccuracies in valve position.

As mentioned heretofore, the present invention contemplates in its broader aspects, the provision of means for regulating the effects of temperature changes on the force-to-position conversions of resilient means such as bellows or springs used in control devices. The principal changes that occur in springs and bellows as a result of temperature changes are temporary dimensional changes which are apparent when the spring or bellows is in its free state, a temporary change in the resiliency of the spring or bellows, and a permanent change in the resiliency thereof.

The temporary dimensional changes which result from temperature changes include changes in the free height or length of a bellows or spring and changes in the coil diameter thereof. As a result of such dimensional changes, the spring rate of the bellows or spring is obviously altered. Such rate changes are, however, comparatively minor in the majority of cases.

The temporary change in the resiliency of a bellows or spring which results from temperature change may be referred to as a change in the modulus of rigidity thereof. As temperature increases the bellows or spring becomes less rigid and the deflection thereof for a known applied force increases. This change in the characteristics of a bellows or spring may also be considered as a change in spring rate and is, in most cases, more significant than the dimensional changes referred to above.

The previously mentioned permanent change in the resiliency of a bellows or spring is commonly known as bellows or spring "relaxation" resulting from the sustained operation of a bellows or spring in a high temperature environment. The present invention is not concerned with the effect of "relaxation" on the force-to-position conversions of bellows or springs.

The principal concern of the present invention is, instead, the regulation of the effects on the force-to-position conversions of a bellows or spring of the above-mentioned temporary resiliency and dimensional changes resulting from temperature changes and of temperature induced dimensional changes in a housing with which the bellows or spring is connected. Since the dimension of a bellows or spring along the line of a force applied thereto will obviously change with a change in bellows or spring resiliency even though the magnitude of the applied force remains constant, the temperature induced resiliency changes may be considered as dimensional changes. Thus, the effects of the two temperature induced changes in the characteristics of a bellows or spring as well as the effect of a housing dimensional change may be regulated by suitably connecting with the bellows or spring a means having a dimension which varies with temperature in a known manner.

The manner in which the effects of temperature induced changes in a bellows or spring are regulated by means having a dimension which varies with temperature in a known manner may vary widely within the scope of the invention. The means having known temperature response characteristics may, for example, be adapted to substantially cancel the effects of some or all of the temperature induced changes in the bellows or spring. The said means may be adapted to cooperate with the bellows or spring so as to provide output position signals which vary in keeping with both the force and the temperature to which the bellows or spring and temperature responsive means are subjected. This last effect may be achieved either through operation of the means having a known temperature response characteristic wherein the effects of temperature changes on the force-to-position conversions of the bellows or spring are partially canceled or through operation of said means wherein such effects are supplemented by the temperature induced changes in the said means.

In the pressure responsive actuator chosen to illustrate the present invention, a means having a dimension subject to change with temperature change in a known manner is connected with the bellows 46 and operates to substantially cancel the effects of bellows resiliency change and housing dimensional change on the pressure-to-position conversions provided by the bellows. The effect on bellows operation of the temporary dimensional changes induced in the bellows by temperature changes is found to be insignificant in this instance and is therefore not compensated for.

A bimetallic disk 48 constitutes the means subject to dimensional change with temperature change which is connected with the bellows 46 of the illustrative pressure responsive actuator. The disk 48, or other similar means, may, of course, be connected with a bellows or spring in various ways within the scope of the invention, but, as shown, the said disk is connected between the free end of the bellows 46 and the stem 16 of the valve 10. A circular member 50 supports the disk 48 at its periphery in substantially coaxial relationship with the bellows 46 and at the lower end thereof. The circular member 50 may be fixedly secured to the lower end of the bellows 46 as by welding and is provided with an annular flange 52 which defines an inwardly facing annular recess 54 for receiving the periphery of the disk 48.

A central axial opening 56 in the disk 48 receives a cylindrical actuator output member 60 which has an annular groove 58 defined between two threaded together portions thereof for receiving an annular portion of the disk adjacent said central opening. The cylindrical member 60 engages the disk on opposite sides and is fixedly connected with the annular portion thereof adjacent the central opening 56 when the two portions of said member are threaded tightly together. A spring 62 disposed in the valve housing 20 engages the valve member 18 supported on the valve stem 16 and biases the said stem upwardly so that the upper end thereof is maintained in engagement with the lower end surface of the cylindrical member 60 at all times.

As shown, the cylindrical member 60 is separate from the bellows 46 but has connected thereto a leaf spring 64 which is secured to the end wall 31 of the housing 30 as by welding. Two edge portions of the leaf spring 64 adjacent an opening 66 therein are shown fitted respectively into two diametrically opposite recesses 68, 68 formed in the member 60. The said spring substantially lessens the effects of lateral vibrations on the position of the valve 10, the actuator as shown being specially adapted for an aircraft application wherein it may be expected to encounter severe vibrations.

The bellows 46 is shown connected with the actuator housing 30 by a supporting member 70 which has a circular portion 72 fixedly secured to the upper end of said bellows. An axially extended portion 74 of the supporting member 70 has a threaded upper end portion for connection with a cap 76 which is secured to the housing 30 by suitable screws 78, 78. A suitably threaded opening 80 in the end wall of a hollow axially extended portion of the cap 76 receives the threaded end portion of the axial extension 74 of the member 70. An axially extending opening 82 is provided in the extension 74 of the member 70 for introducing fluid under pressure to the interior of the bellows 46. A pair of spaced apart annular flanges 84, 84 are also provided on the axial extension 74 and define an annular recess for receiving a ring seal 86 which prevents the escape of fluid from the chamber 42.

From the foregoing, it will be apparent that when fluid at a substantially constant pressure is supplied to the interior of the bellows 46 through the axial opening 82 in the supporting member 70, the length of the said bellows will vary in keeping with the pressure of the fluid in the chamber 42 of the actuator housing 30. The movement of the lower end of the bellows will be transmitted to the valve stem 16 by the bimetallic disk 48 and the cylindrical member 60 so that the position of the valve member 18 will be adjusted in keeping with the said fluid pressure. Thus, a discreet position of the valve member 18 relative to the valve seat 28 will be established for each fluid pressure which occurs in the chamber 42.

The manner in which the bimetallic disk 48 operates to substantially cancel the effects of temperature changes on the position of the valve 10 is suggested by the above description of the actuator elements. Assume, for example, that the temperature increases substantially while the fluid pressures in the chamber 42 and within the bellows 46 remain substantially constant. Expansion of the actuator housing 30 resulting from the increased temperature will tend to cause the bellows 46 and thus the valve member 18 to be moved upwardly relative to the valve seat 28. The increased temperature will also effect a change in the resiliency of the bellows 46, the said bellows becoming temporarily less rigid and therefore collapsing slightly at the urging of the fluid pressure in the chamber 42 and tending to cause further upward movement of the valve member 18. The bimetallic disk 46, however, will be deflected axially downwardly at its central portion as a result of the increased temperature. This downward deflection of the disk central portion will tend to move the valve member 18 downwardly relative to its seat 28 with the result that the effects of bellows resiliency change and the housing dimensional change on valve position will be substantially canceled.

The invention claimed is:

A fluid pressure responsive actuator comprising a housing having an opening connectible with a supply of fluid under pressure, a bellows disposed within the housing so as to be acted on externally by fluid in said housing, said bellows having one end rigidly connected with the housing and the opposite end free for movement, a support member provided with an inwardly facing annular recess secured to the free end of said bellows, a centrally apertured bimetallic bowed disc having a peripheral portion entered in said annular recess, said disc being surrounded by fluid in said housing and being arranged so that its center portion moves axially away from said bellows as a result of a change in its curvature when the temperature of the fluid in the housing increases, an actuator output element separate from said bellows entered in the central opening in said bimetallic disc and connected to the latter for movement with its said central portion, said actuator element including a portion extending axially away from said disc, and leaf spring means connected with said housing and engaging said portion of said actuator element to restrain the latter against lateral movement relative to said housing.

References Cited in the file of this patent
UNITED STATES PATENTS

| | | |
|---|---|---|
| 2,101,735 | Fonseca | Dec. 7, 1937 |
| 2,161,743 | Heinrich et al. | June 6, 1939 |
| 2,162,308 | Jenny | June 13, 1939 |
| 2,233,117 | Waddell | Feb. 25, 1941 |
| 2,235,314 | Diggins et al. | Mar. 18, 1941 |
| 2,242,718 | Dynes | May 20, 1941 |
| 2,301,879 | Jenny | Nov. 10, 1942 |
| 2,546,571 | Watson | Mar. 27, 1951 |
| 2,763,450 | Hanna et al. | Sept. 18, 1956 |
| 2,827,716 | Reese | Mar. 25, 1958 |
| 2,894,392 | McLaughlin | July 14, 1959 |